3,305,373
CERAMIC COMPOSITIONS AND PROCESS OF MAKING SAME
Yorihiro Murata, North Tonawanda, and Leo R. Sucharski, Sloan, N.Y., assignors to The Carborundum Company, Niagara Falls, N.Y., a corporation of Delaware
No Drawing. Filed Nov. 8, 1965, Ser. No. 506,876
15 Claims. (Cl. 106—55)

The present invention relates to new and useful ceramic compositions, and more particularly to ceramic compositions useful for the fabrication of cutting tool tips and the like. The invention further relates to such cutting tool tips and other hard, wear-resistant articles, and to processes for the production of the aforesaid compositions, cutting tool tips and other articles.

In recent years many new superalloys and refractory metals have been introduced having properties which render them of great interest in numerous fields such as the manufacture of aircraft and space vehicles. The high strength of such metals and alloys results in a problem of greatly reduced machinability which imposes severe limitations on the fabrication of parts from such materials. Machining rates for these materials are often substantially less than those for the more conventional older low alloy steels. A number of types of cutting materials have heretofore been available. These include various hard metals and alloys, cermets, such as tungsten carbide bonded by cobalt, and ceramic materials such as sintered or hot pressed alumina. For certain machining applications, the ceramic types of cutting materials are generally regarded as superior to the other types with respect to such factors as abrasion and corrosion resistance, machining speed, quality of finish of the work material, and ability to withstand high tool tip temperatures. However, some of the newer types of metals and alloys are so difficult to machine with cutting materials heretofore available that there is a clear-cut need for harder and more durable materials such as are used for cutting tool tips.

It is therefore an object of this invention to produce compositions of great hardness, wear-resistance, and durability. It is a further object of this invention to produce cutting tool tips and other hard, wear-resistant articles composed of such compositions. It is also an object of this invention to afford processes for producing such compositions, and for fabricating such cutting tool tips and other hard, wear-resistant articles. It is a further object of this invention to provide new cutting materials which make it possible to achieve acceptable machining rates in the fabrication of parts from difficultly machinable metals.

In essence, the various objects of this invention are achieved by intimately admixing tantalum mononitride (TaN) and titanium diboride ($TiB_2$) and hot pressing the mixture. As a result of hot pressing the $TaN-TiB_2$ mixture, the chemical and physical properties of the initial mixture are substantially changed and an extremely hard, dense, and durable composition is formed which is well suited to use in cutting tool tips and other hard-wear-resistant articles. As will become more apparent from the following description, the intimate mixture of tantalum mononitride and titanium diboride may either be hot pressed in a mold which is of suitable design to produce a cutting tool tip or other article directly, or alternatively, the mixture may be hot pressed in a mold which is designed to form a slug or pellet from which the desired article can be fabricated by conventional means. In general, it is economically preferable to form the desired article in the first instance, thereby eliminating the intermediate step whereby the inventive composition is first formed as a slug from which the article may be fabricated. On the other hand, however, it may at times be preferred to form the composition as a slug first as, for example, when a mold of the shape desired for the final article is unavailable or where an article of a particularly intricate shape is required.

It has been found that the precise proportion of tantalum mononitride to titanium diboride in the initial mixture to be hot pressed is rather critical with respect to obtaining the desired characteristics in the hot pressed composition. Specifically, in order to produce a hot pressed composition according to the invention which will give an acceptable cutting tool tip from the standpoint of durability in use, the initial mixture or raw batch must contain from about 40 to about 65 percent of tantalum mononitride, and conversely from about 60 to about 35 percent of titanium diboride. A number of properties are generally thought to be desirable in compositions to be used for cutting tool tips. Such properties include high density, low porosity, and high modulus of rupture. However, the ultimate test of the true value of a cutting tool tip is its durability in use, especially when employed for comparatively high speed cutting. Cutting tool tips fabricated from compositions obtained by hot pressing initial mixtures which vary from the above ranges are subject to premature failure under severe conditions of use.

More particularly, the preferred initial mixture contains about 55 percent of tantalum mononitride and about 45 percent of titanium diboride, because the composition resulting from hot pressing such a mixture gives a cutting tool tip of maximum durability.

In order to impart optimum properties to the hot pressed composition, it is important that the tantalum mononitride and titanium diboride used to prepare the initial mixture to be finely divided, preferably having a maximum particle size of about 45 microns.

In order to produce a hot pressed composition of suitable quality, it is important that the finely divided powders be intimately mixed. For the purposes of the invention, the intimate mixture may be obtained by any convenient means. However, the following procedure has been found to be desirable. The ingredients are placed in a ball mill with a sufficient volume of a suitable liquid to form a thick slurry, and the mill is rotated to obtain the desired mixing, following which the mixture is dried. In view of the abrasive nature of the ingredients, it is preferred to use a rubber lined ball mill, and the balls should be of some hard material such as stainless steel or tungsten carbide bonded by cobalt. The liquid selected for the purpose should be such as will not affect the rubber lining of the ball mill, and it should preferably be relatively volatile. Among the liquids found suitable are ethanol and methanol. Rotation of the ball mill for about 30 minutes or less usually suffices to give the desired intimate intermingling of the ingredients, and unnecessarily long periods should be avoided to minimize contamination resulting from the abrasive action of the ingredients on the balls. The drying step may be carried out in any convenient manner but preferably is conducted at a temperature of less than about 75° C., since higher temperatures may tend to result in undesirable agglomeration of the mixture. A warm air oven or a vacuum drier may convenient be used.

The hot pressing step may be carried out in any of a variety of conventional type molds known in the art, such as graphite molds. As noted above, the mold may be of a design suitable for the formation of a cutting tool tip of the desired shape, e.g., square, diamond-shaped, triangular, etc.; or to form any other desired article. Alternatively, the mold may be of such design as to produce a slug from which such articles may subsequently be fabricated. After placing the $TaN-TiB_2$ mixture in the mold it is desirable, though not essential, to apply vibration to the mold in order to facilitate the settling of the particles to achieve more uniform packing and to level the surface of the powder to give a layer of fairly uniform thickness.

Essentially, the hot pressing step consists of subjecting the intimately mixed ingredients to pressure at an elevated temperature. Although the precise means of achieving these conditions is not critical, it is generally convenient to proceed as follows. The mold, containing the mixture, is placed in a closed container which is disposed within the coil of a high-frequency induction furnace, and while the mixture in the mold is heated to about 2000° C. it is subjected to pressure by means of a plunger passing through the lid of the container that transmits pressure from a suitable device such as a pressure cylinder. In order to protect the mold from oxidation, especially if a graphite mold is employed, it is desirable to carry out the hot pressing in a non-oxidizing atmosphere. A continuous stream of nitrogen or other inert gas may be introduced into the container before starting the heating, to replace the air and maintain an inert atmosphere, or the container may be evacuated.

The invention will be further described in conjunction with the following examples, which are intended to illustrate and not to limit the inventive concepts.

EXAMPLE 1.—PREPARATION OF COMPOSITION FROM 55% TaN–45% TiB$_2$

To a raw batch composed of 110 g. of finely divided TaN and 90 g. of finely divided ZrB$_2$, 25 ml. of ethyl alcohol is added to form a thick slurry. The slurry is poured into a rubber lined ball mill having a length of approximately 6.5 cm. and an inside diameter of approximately 10 cm., the mill previously having been filled to about one-quarter of its capacity with stainless steel balls ranging from approximately 1 to approximately 1.5 cm. in diameter. Milling is carried on for about 30 minutes, after which the mixture is dried in a hot air oven at 60° C. After removal of the stainless steel balls by means of a coarse sieve, the mixture is ready for hot pressing.

A graphite mold approximately 15 cm. high having an outer diameter of approximately 7.5 cm. and a compression chamber approximately 2.5 cm. in diameter with fitting plungers is employed for the hot pressing. A 23.2 g. portion of the above mixture is placed in the mold, which is then placed on a vibrating table to settle and level its contents. The mold is placed in a container which is disposed within the coil of a high-frequency induction furnace, and the container is covered with a lid. A pressure of about 185 kg./square cm. is applied and maintained on the mold plungers. A stream of nitrogen is introduced continuously into the container through a port therein, the atmosphere of the container being vented through a second port in the container. The power is turned on and the temperature is allowed to reach 2000° C., as measured by an optical pyrometer. This requires about 45 minutes. This temperature is held substantially constant for 30 minutes, whereupon the pressure is released and the power is shut off. The nitrogen stream is continued and the system is permitted to cool to about room temperature, about 5 hours being required. The hot pressed body is ejected from the mold and polished by means of a diamond grinding disc.

The body formed by the foregoing steps is a round slug measuring approximately 2.5 cm. in diameter by approximately 0.6 cm. in thickness.

EXAMPLE 2.—PREPARATION OF COMPOSITIONS FROM VARIOUS PROPORTIONS OF TaN–TiB$_2$

In substantial accordance with the procedure of Example 1, slugs of different compositions are prepared by hot pressing mixtures consisting of desired proportions of TaN and TiB$_2$. The proportions are indicated as percents in the following list, and the amount of mixture used to form a slug approximately 0.6 cm. thick and approximately 2.5 cm. in diameter is also set forth.

| Percent TaN | Percent TiB$_2$ | Grams of mixture per slug |
|---|---|---|
| 45 | 55 | 21.0 |
| 50 | 50 | 22.1 |
| 60 | 40 | 24.6 |
| 65 | 35 | 26.2 |

EXAMPLE 3.—FABRICATION OF CUTTING TOOL TIPS

From slugs prepared as in Examples 1 and 2, cutting tool tips are fabricated by utilizing conventional means to grind and polish the slugs to a thickness of approximately 0.475 cm. and form a square approximately 1.27 cm. across with corners rounded to a radius of approximately 0.16 cm. These dimensions were established within sufficiently close tolerances as to permit accurate comparisons of the tips in cutting tests.

The temperature should be sufficiently high during hot pressing to permit densification, under the influence of pressure, to a relative density (i.e., actual density/theoretical density expressed as percent) of the order of 80% or more. On the other hand, an unnecessarily high temperature should be avoided, since excessive temperatures tend to result in the formation of large grains which in turn are adverse to durability and wear-resistance in the hot pressed composition. In general, hot pressing temperatures in the range from about 1800° C. to about 2200° C. may be used. For the various proportions of TaN and TiB$_2$ contemplated by this invention and at a pressure of about 185 kg./cm$^2$, a temperature of 2100° C. is sufficiently high to achieve the desired densification without unduly large grain size. However, it has been found that the preferred temperature varies to some extent with the proportion of TaN to TiB$_2$ in the raw batch, and that lower temperatures may be employed as the percentage of TaN is increased from about 40% to about 65%. Thus for a raw batch composed of 65% TaN–35% TiB$_2$, a temperature of about 1800° C. is sufficiently high to achieve the desired densification, while for the preferred mixture of 55% TaN–45% TiB$_2$ a temperature from about 2000° C. to about 2100° C. is desirable, and for a raw batch of 40% TaN–60% TiB$_2$ a temperature of about 2100° C. is desirable.

As is well known, the pressure employed in hot pressing operations is also an important factor. Although maximum pressures are not critical the minimum pressure used must, of course, be such as to obtain the required degree of densification at the prevailing temperature during the heating time employed. In the present case a pressure of at least about 125 kg./cm.$^2$ is preferred although under favorable conditions pressures as low as about 70 kg./cm.$^2$ may be used. More particularly a pressure within the range from about 150 to 200 kg./cm.$^2$ is preferred. Higher pressures may be used but there appears to be no advantage in general to the use of pressures above about 350–400 kg./cm.$^2$.

The time during which the composition is maintained under maximum temperature and the desired pressure conditions should be sufficiently long to permit virtually maximum densification. Densification curves, i.e., relative density plotted as a function of time at specific temperature and pressure, have been ascertained precisely by using special apparatus attached to the furnace. These curves indicate that, for raw batches of the range of proportions contemplated by this invention, the point of virtually maximum densification is usually reached within about 30 minutes after maximum temperature is reached. Longer periods may be employed, but unnecessarily long periods should be avoided since other properties of the hot pressed composition, such as grain size, may be adversely affected.

It is generally known that there is some degree of interrelationship between the temperature, pressure and time of hot pressing. Thus as lower pressures are employed, somewhat longer periods of time may be required in order to achieve the desired degree of densification. However, as noted above, unduly prolonged time periods at the temperature used for hot pressing may tend to result in larger grain size, and it will therefore generally be preferred to employ a sufficiently high pressure to achieve densification in a relatively short time. Likewise, the higher temperatures in the range specified will usually be preferred inasmuch as densification will then tend to occur more rapidly at any given pressure.

After virtually maximum densification has been achieved under the foregoing conditions, the composition is permitted to cool. From Example 1, it may be seen that the pressure may be released at the outset of the cooling process. It may, however, optionally be maintained until any convenient point in the cooling stage. While the cooling stage required about 5 hours in Example 1, it should be noted that the rate of temperature decrease will ordinarily become slower as the temperature becomes lower, and that the rapid rate of cooling at the beginning of the cooling stage is highly desirable. More particularly, it is preferred that the temperature drop to the range of about 800–1000° C. within the first hour or less. Rapid cooling to this point minimizes the possibility of undesirable changes in the hot pressed composition, particularly since rapid cooling tends to retain a small grain size which in turn favors a high modulus of rupture and great hardness in the hot pressed body. Once the temperature has been reduced to about 800–1000° C., however, no significant further change of grain size occurs, and accordingly further cooling may proceed leisurely. When the temperature approaches room temperature, the body may be ejected from the mold. It is generally preferred to grind the surfaces of the hot pressed body by means of a diamond grinding disc or other conventional means, in order to polish the surfaces and remove any particles which may adhere from the graphite mold.

As noted above, the ingredients originally present in the raw batch undergo substantial chemical changes, and physical changes, including densification and solid solution formation, during hot pressing. While the general nature of certain of these changes can be ascertained to some extent, it is virtually impossible with presently available means to characterize completely the composition of the hot pressed body. For example, phase analysis using X-ray diffraction indicated that a hot pressed body prepared substantially by the method of Example 1 was composed of at least two phases. A weak to moderate amount of a gamma-TaB phase and a moderate to strong amount of a $TiB_2$ type solid solution were found to be present. In addition, a small amount of one or more unidentifiable phases was probably present. While such a phase composition appears to be unique, it is to be observed that the precise composition of the solid solution phase cannot by any known means be ascertained, nor can the precise amounts of the two phases be easily ascertained, thus even apart from the unidentifiable phases which may be present, a meaningful definition of the hot pressed composition is impossible. The problem of characterizing the composition exactly is further complicated by the present unavailability of any means other than X-ray analysis to aid the characterization materially. Furthermore, the phase composition of the hot pressed bodies varies markedly with the proportion of TaN to $TiB_2$ in the raw batch, as well as with the temperature and time of hot pressing.

In general, however, it may be said that articles made according to this invention are tough, durable, corrosion-resistant and wear-resistant, demonstrating these properties even at high temperatures. The hardness of such articles may be as high as 97 on the Rockwell N15 scale and is at least of the order of 80. They are also quite dense. The density of course varies with the composition, articles of the preferred composition having a density of about 5.8 g./cc., within the range from about 5.5 g./cc. to about 9.0 g./cc. for the range of compositions with which the present application is concerned As a result of these highly desirable properties, it will be apparent that the inventive compositions will find utility not only in cutting tool tips but also for various other applications where such properties are required, such as the manufacture of extrusion dies and wear-resistant inserts.

The results of comparative tests on cutting tool tips prepared according to Example 3 are reported below. In each case, constant conditions of tool geometry were adhered to. The tool life end point in each case was taken to be the point in time at which the tip showed a uniform wear of 0.381 mm. or a localized wear of 0.762 mm., whichever occurred first. The work material employed in all tests was AISI 4140 steel having a Rockwell C hardness of 29–31. The rate of feed per revolution of the work material was 0.396 mm.; the depth of cut was 1.27 mm.; and the cutting speed, i.e., the speed at which a point on the surface of the work material travels as the work material revolves against the tool tip, was 1000 feet per minute (or 304.8 meters per minute).

Table I indicates the life in minutes of tool tips fabricated as in Example 3 and shows the variation of tool tip life as a function of the proportion of ingredients.

TABLE I

| Percent TaN | Percent $TiB_2$ | Tool Tip Life (Minutes) |
| --- | --- | --- |
| 45 | 55 | 6 |
| 50 | 50 | 8 |
| 55 | 45 | 9 |
| 60 | 40 | 7 |
| 65 | 35 | 3 |

In order to provide a basis for comparing the tips tested above with presently known ceramic tips, a superior, high purity, high density, hot pressed alumina tip manufactured by The Carborundum Company and commercially known as CCT–707 was subjected to testing under the conditions specified above, and was found to have a life of only about 8 minutes. A cobalt-bonded tungsten carbide tool tip, when subjected to testing under the conditions above specified was found to have a life of less than 2 minutes. It is thus evident that the tool tips comprehended by the present invention are quite efficient. It has also been noted that a tool tip formed by hot pressing a mixture of 70% TaN–30% $TiB_2$ (outside the scope of the invention) failed within less than one minute.

In the foregoing specification and the following claims, all references to amounts of material or proportions in terms of percent are intended to mean percent by weight, except as expressly indicated otherwise.

We claim:

1. A composition of matter made by hot pressing an intimate mixture consisting essentially of from about 40 to about 65 percent of tantalum mononitride and from about 60 to about 35 percent of titanium diboride at a temperature in the range from about 1800° C. to about 2200° C.

2. A composition of matter according to claim 1 wherein the mixture consists essentially of about 55 percent of tantalum mononitride and about 45 percent of titanium diboride.

3. A composition of matter according to claim 1 in which the hot pressing is carried out at a pressure of at least about 70 kg./cm.$^2$.

4. A composition of matter according to claim 1 in which the hot pressing is carried out at a pressure in the range from about 150 to about 200 kg./cm.$^2$.

5. A cutting tool tip formed from a hot pressed composition as defined in claim 1.

6. A cutting tool tip according to claim 5 wherein the mixture consists essentially of about 55 percent of tantalum mononitride and about 45 percent of titanium diboride.

7. A cutting tool tip according to claim 5 in which the hot pressing is carried out at a pressure of at least about 70 kg./cm.$^2$.

8. A cutting tool tip according to claim 5 in which the hot pressing is carried out at a pressure in the range from about 150 to about 200 kg./cm.$^2$.

9. A process for making a composition of matter suitable for making hard, wear-resistant articles, comprising hot pressing an intimate mixture consisting essentially of from about 40 to about 65 percent of tantalum mononitride and from about 60 to about 35 percent of titanium diboride at a temperature in the range from about 1800° C. to about 2200° C.

10. A process according to claim 9 wherein the mixture consists essentially of about 55 percent of tantalum mononitride and about 45 percent of titanium diboride.

11. A process according to claim 10 wherein the mixture consists essentially of about 55 percent of tantalum mononitride and about 45 percent of titanium diboride, and is hot pressed at a temperature of about 2000° C.

12. A process according to claim 9 in which the hot pressing is carried out at a pressure of at least about 70 kg./cm.$^2$.

13. A process according to claim 9 in which the hot pressing is carried out at a pressure within the range from about 150 to about 200 kg./cm.$^2$.

14. A raw batch for the manufacture of hard, wear-resistant materials, said raw batch consisting essentially of from about 40 to about 65 percent of tantalum mononitride and from about 60 to about 35 percent of titanium diboride.

15. A raw batch according to claim 14 in which the tantalum mononitride is present to the extent of about 55 percent and the titanium diboride is present to the extent of about 45 percent.

References Cited by the Examiner

UNITED STATES PATENTS

| | | | |
|---|---|---|---|
| 2,108,618 | 2/1938 | Selyjesaeter | 106—43 |
| 2,124,509 | 7/1938 | McKenna | 106—43 |
| 2,802,748 | 8/1957 | Glaser | 106—55 |
| 2,814,566 | 11/1957 | Glaser | 106—43 |

HELEN M. McCARTHY, *Acting Primary Examiner.*

TOBIAS E. LEVOW, *Examiner.*

J. POER, *Assistant Examiner.*